United States Patent [19]

Page et al.

[11] Patent Number: 5,035,462
[45] Date of Patent: Jul. 30, 1991

[54] UTILITY VEHICLE CHASSIS HAVING A VERTICALLY ADJUSTABLE BED

[75] Inventors: Robert L. G. Page, Sydney; William J. Honan, Brisbane, both of Australia

[73] Assignee: Hynbrood Pty. Limited, Matraville, Australia

[21] Appl. No.: 252,189

[22] Filed: Sep. 30, 1988

[51] Int. Cl.$^5$ .............................................. B60P 1/02
[52] U.S. Cl. .................................... 296/183; 414/557; 414/495
[58] Field of Search ............... 296/183, 204; 414/546, 414/556, 557, 495

[56] References Cited

U.S. PATENT DOCUMENTS

| | | | |
|---|---|---|---|
| 1,487,201 | 3/1924 | Brezovitz et al. | 298/13 |
| 3,066,816 | 12/1962 | Schwartz | 414/480 |
| 3,468,440 | 9/1969 | Poole | 414/458 |
| 3,707,238 | 12/1972 | Thibodeau, Sr. | 414/458 |
| 4,168,932 | 9/1979 | Clark | 414/483 |
| 4,673,328 | 6/1987 | Shiels | 414/495 |

FOREIGN PATENT DOCUMENTS

| | | |
|---|---|---|
| 167832 | 1/1954 | Australia . |
| 901517 | 1/1954 | Fed. Rep. of Germany . |
| 960962 | 3/1957 | Fed. Rep. of Germany . |
| 2754009 | 6/1978 | Fed. Rep. of Germany . |
| 85/00298 | 11/1985 | PCT Int'l Appl. . |
| 1450337 | 5/1974 | United Kingdom . |

Primary Examiner—Margaret A. Focarino
Assistant Examiner—Joseph D. Pape
Attorney, Agent, or Firm—Arnold, White & Durkee

[57] ABSTRACT

A vehicle chassis is disclosed that includes a frame, front suspension, rear suspension and vertically adjustable bed. The frame includes two mirrored image side rails connected to each other by a bumper, torque box and at least one cross member. The frame structure forms an enclosed frontal section and a U-shaped back section. The front section is adapted to receive a motor, transmission, cab, and the front suspension. A roll bar support assembly is disposed above the torque box to support the U-shaped section of the frame. The back U-shaped section is adapted to receive the adjustable bed and rear suspension. The adjustable bed maintains a constant horizontal orientation when moving from a grounded loading position to a raised transporting position. The rear suspension includes two separate independently acting assemblies with one disposed on each side of the back U-shaped section.

1 Claim, 11 Drawing Sheets

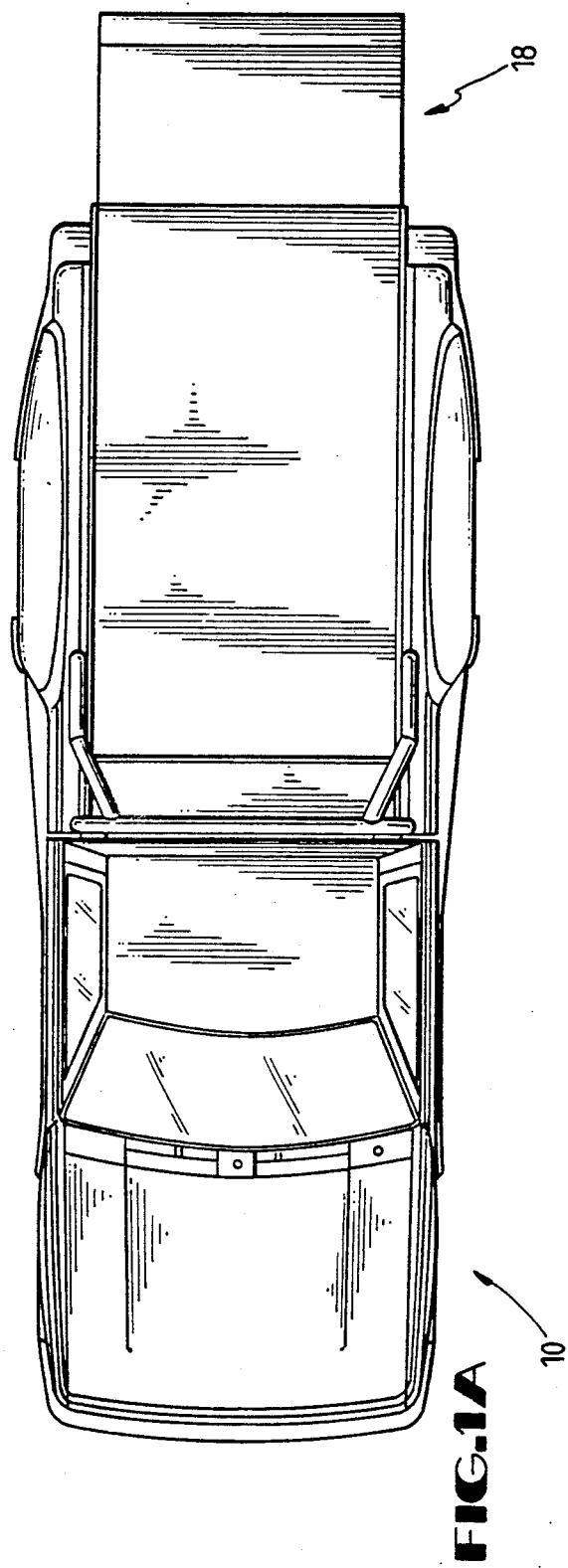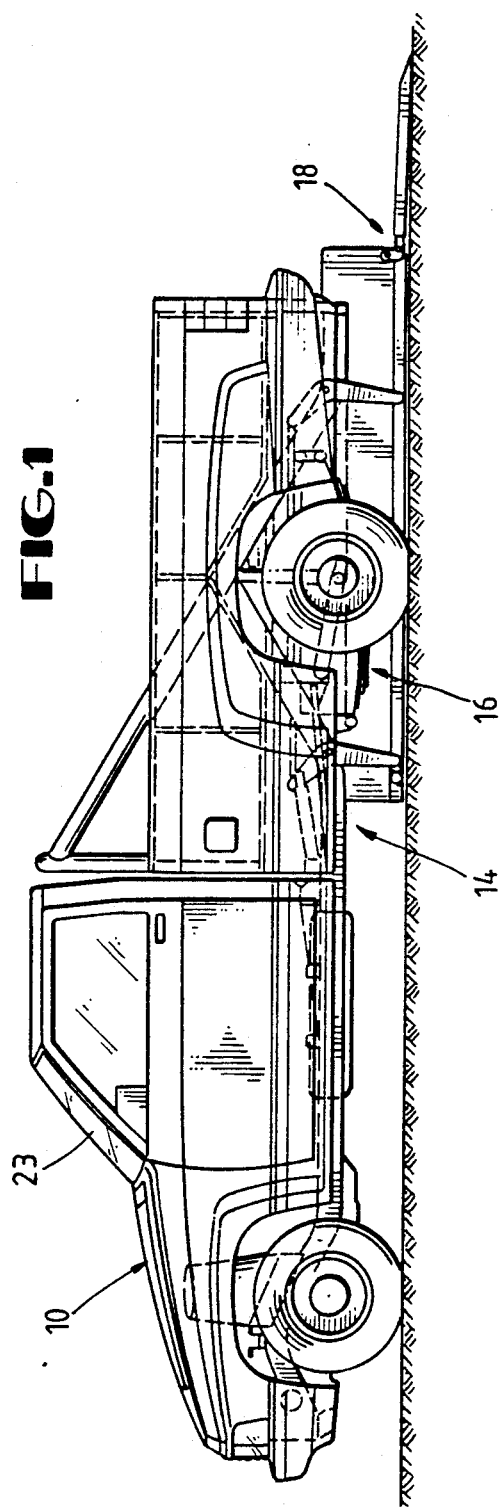

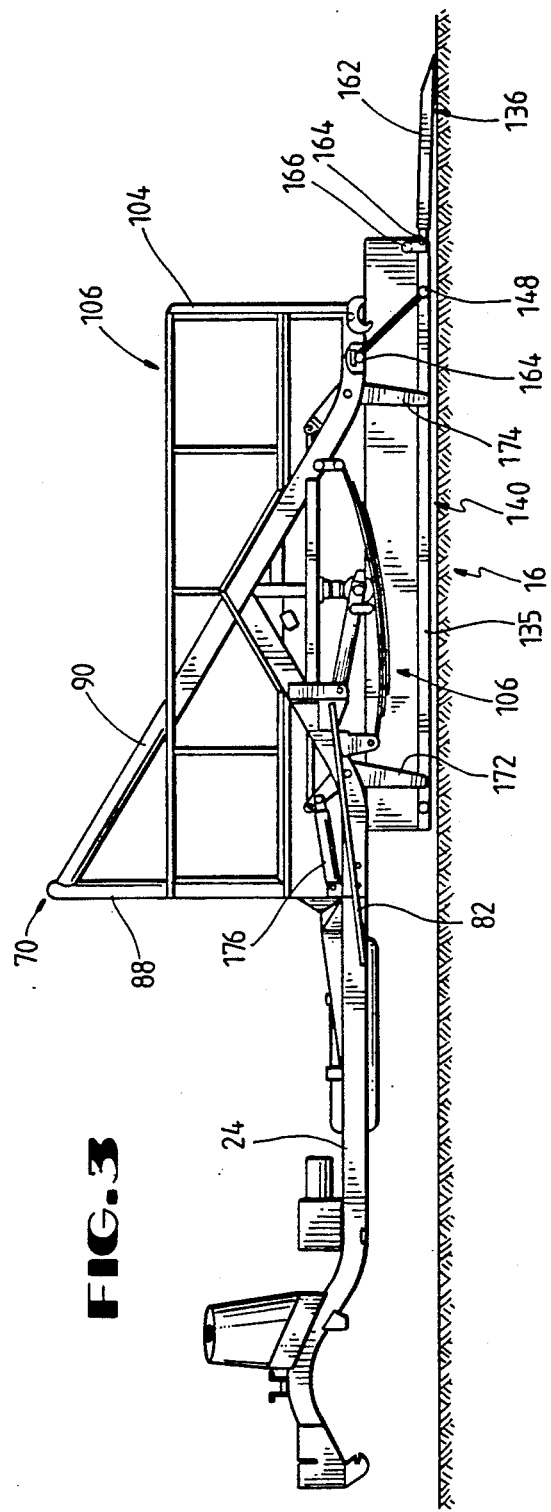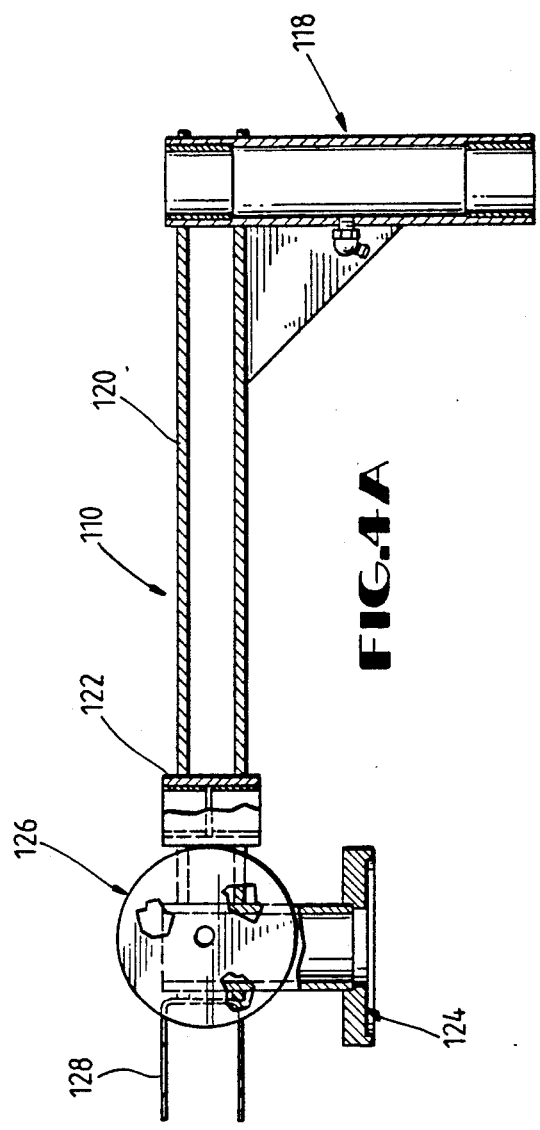

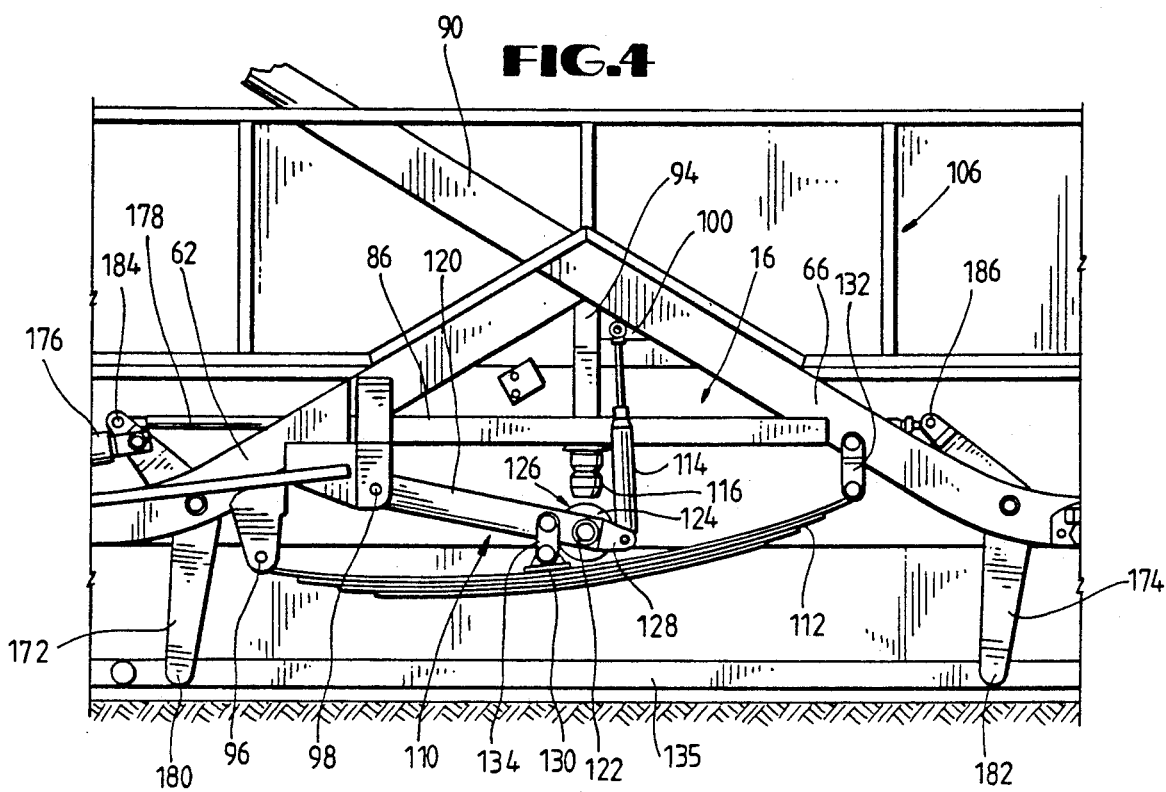
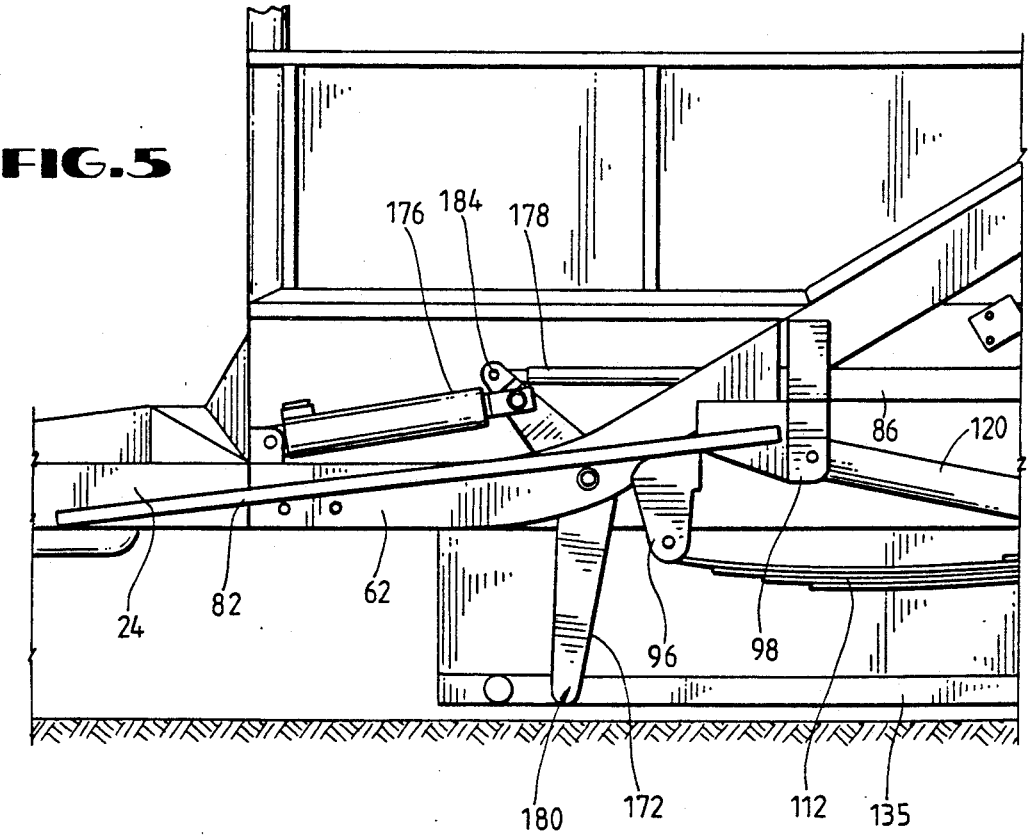

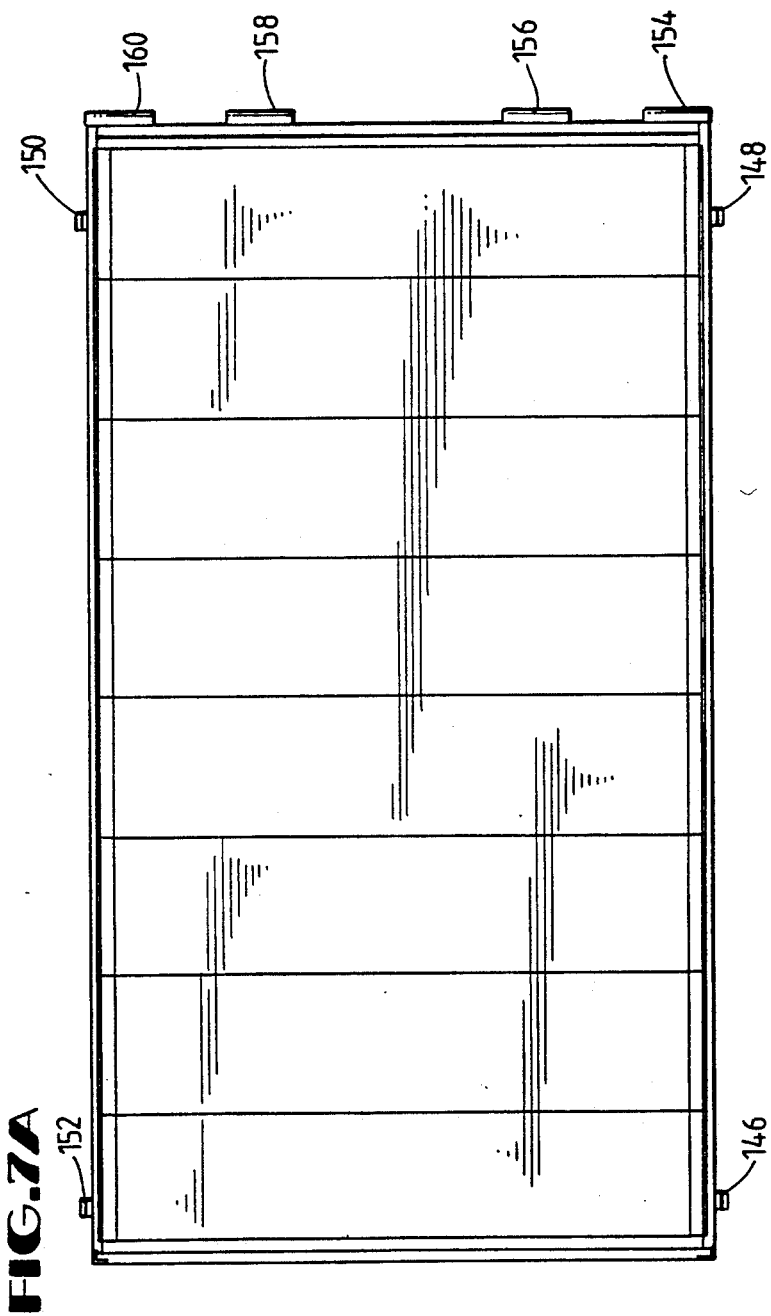

UTILITY VEHICLE CHASSIS HAVING A VERTICALLY ADJUSTABLE BED

BACKGROUND OF THE INVENTION

1. Field of the Invention

The present invention relates to a chassis for a pickup truck or van having a vertically adjustable bed.

2. Background Art

Pickup trucks and vans have long been used as utility vehicles. One of the most common uses for such vehicles is the transportation of cargo. The cargo must be loaded onto and off of the vehicle bed. Loading, unloading and positioning cargo on the bed can be difficult especially when handling heavy or awkward cargo.

Several means have been used to solve loading, unloading and positioning problems. Examples of such means include:

1. Lift trucks;
2. Ramps;
3. Lifting tail gates; and
4. Adjustable beds.

Each of these means is helpful. However, each has its own draw backs. For instance, lift trucks are not always available and can be awkward to use in the limited space of a vehicle bed. Ramps require space behind the vehicle. Vertically adjustable tail gates are limited in the size and weight of cargo they can handle and may require counter balancing.

There are two basic types of adjustable utility vehicle beds. The adjustable beds include pivoting beds and vertically adjustable beds.

Pivoting beds include a bed pivotally connected to a vehicle chassis above the rear axle. The front of the bed is releasably connected to the vehicle to maintain the bed in a substantially horizontal orientation. Loading is accomplished by releasing the front end of the bed allowing the bed to pivot until the back end contacts the surface on which the vehicle is resting. In that position the bed forms a ramp onto which the cargo may be rolled, pulled or pushed.

Even though pivoting beds reduce loading problems, there are some draw backs. For instance, loading large or heavy cargo can be dangerous when the center of gravity of the cargo moves past the bed pivot point. Positioning loads on the bed is also difficult because the loads have a tendency to slide when the bed is in the ramped loading position.

Vertically adjustable beds include a bed connected to the frame by rotatably connected linkages. That arrangement allows the bed to remain substantially horizontal when moved from a raised transporting position to a lowered loading position and back again. That feature solves the shifting and sliding problems of pivoting beds.

Even though the vertically adjustable bed reduces many of the cargo handling problems there are some draw backs. The back portion of the frame is U-shaped. Rear axles and lateral supports cannot be disposed underneath the frame because the bed could not be grounded. Overhead supports limit the height of the cargo that can be carried. Without some lateral means of support there is a problem with frame stability.

The description in the Background is meant to be illustrative rather than exhaustive. It is intended to identify problems associated with the present state of the art.

SUMMARY OF INVENTION

The invention is directed to a utility vehicle chassis having an adjustable bed. Briefly, the invention includes a frame assembly adapted to receive and support a front suspension, rear suspension and adjustable bed.

The frame assembly includes two mirror image side rail assemblies, a bumper disposed between the front end of the side rail assembly, a torque box disposed between the mid point of each rail assembly and a roll bar support assembly. The roll bar support assembly includes a roll bar disposed across and above the torque box and two support members disposed above the side rails that extend from the top of the roll bar and angle rearwardly into the respective side rails.

The frame assembly is divided into front and back sections. The front section is defined by the area between the bumper and torque box. The back section is defined by the U-shaped section from the roll bar support rearward.

The bumper, torque box and side rails provide structural integrity to the front section. The torque box, roll bar support assembly and side rail braces provide structural integrity to the U-shaped back section.

The front suspension is disposed in the front section. The front suspension includes a conventional front wheel drive truck suspension preferably incorporating McPherson struts.

The rear suspension is disposed in the back section. The rear suspension includes two mirror image assemblies supported by and disposed on opposite sides of the side rails. The rear suspension includes a trailing arm, leaf spring and shock absorber that are interconnected with each other through the trailing arm. This arrangement provides strength and assists in maintaining proper alignment of the rear wheels.

The adjustable bed is pivotally disposed in the U-shaped back section. The bed is connected to the side rails by linkages (preferably by "boomerangs"). The boomerangs allow the bed to move vertically up and down while maintaining a substantially horizontal orientation. The boomerangs are driven by an articulating device preferably hydraulic cylinders.

The bed may also include a reciprocating tailgate. The preferred tailgate automatically closes when the bed is being raised and automatically opens when the bed is lowered.

The bed may also include a positive locating assembly. The preferred locating assembly includes bobbins disposed on each side of the bed that engage corresponding latch plates disposed on the side of the rails. This assembly ensures and maintains consistent positioning of the bed while in the transporting position.

BRIEF DESCRIPTION OF THE DRAWING

FIG. 1 is a side view of a pickup truck showing the preferred chassis in the lowered position.

FIG. 1A is a top view of a pickup truck showing the preferred chassis in the lowered position.

FIG. 2 is a top view of the preferred frame.

FIG. 2A is a top view of the preferred frame.

FIG. 3 is a side view of the frame, suspension and bed in the lowered (loading) position.

FIG. 4 is a side view of the left rear suspension assembly.

FIG. 4A is a top view of the trailing arm assembly.

FIG. 5 is a side view of the left front portion of the bed.

FIG. 7 is the top view of the bed.

FIG. 7A is the side view of the bed.

DESCRIPTION OF THE PREFERRED EMBODIMENT

Figure 6:
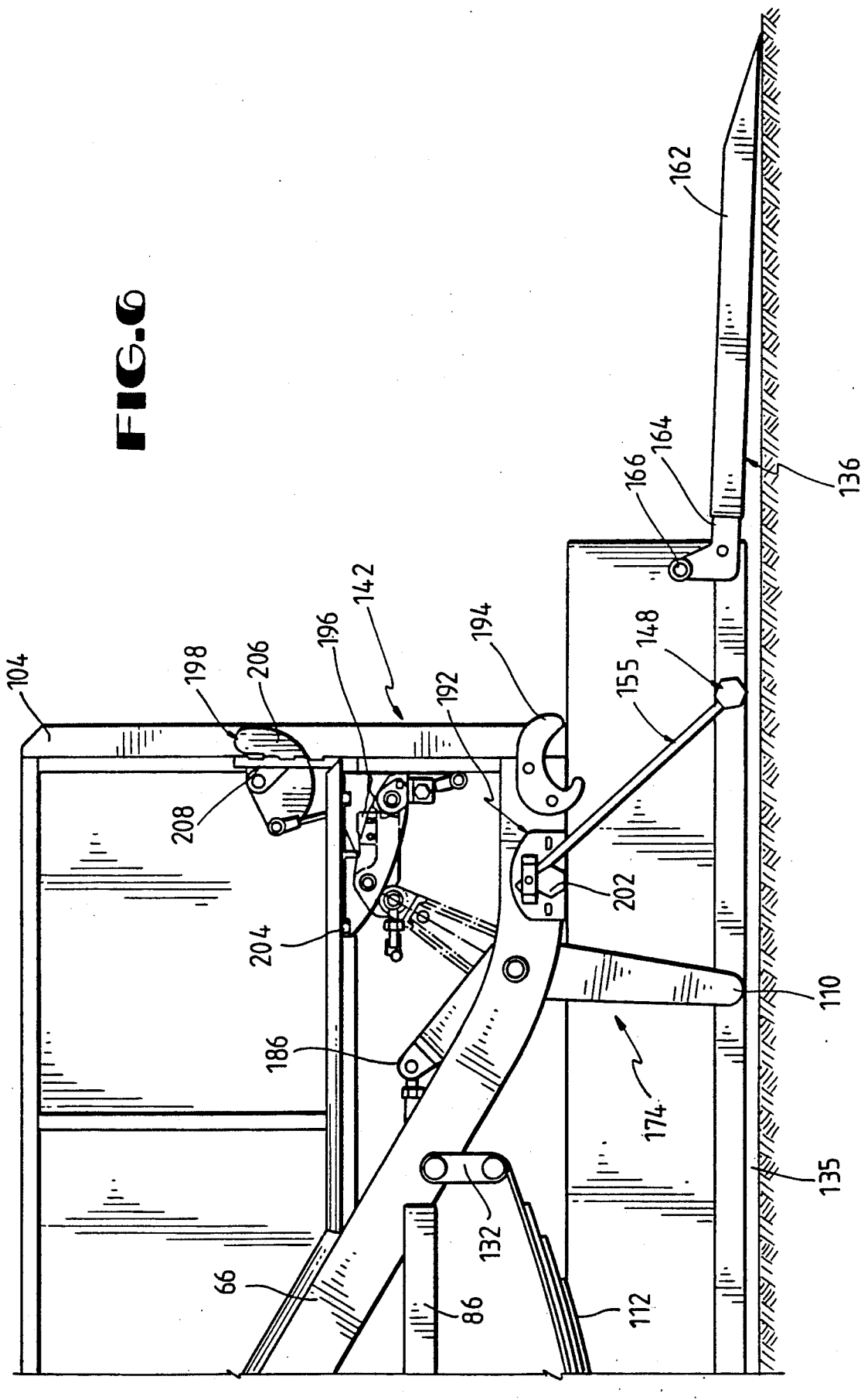
FIG. 6 is a side view of the left portion of the tail gate assembly.

A pickup truck 10 that includes the preferred chassis 12 is shown in FIGS. 1 and 1A. The chassis 12 includes a frame 14 that supports a front suspension (not shown), rear suspension 16 and vertically adjustable bed 18.

Frame Assembly

Figures 2, 2A:
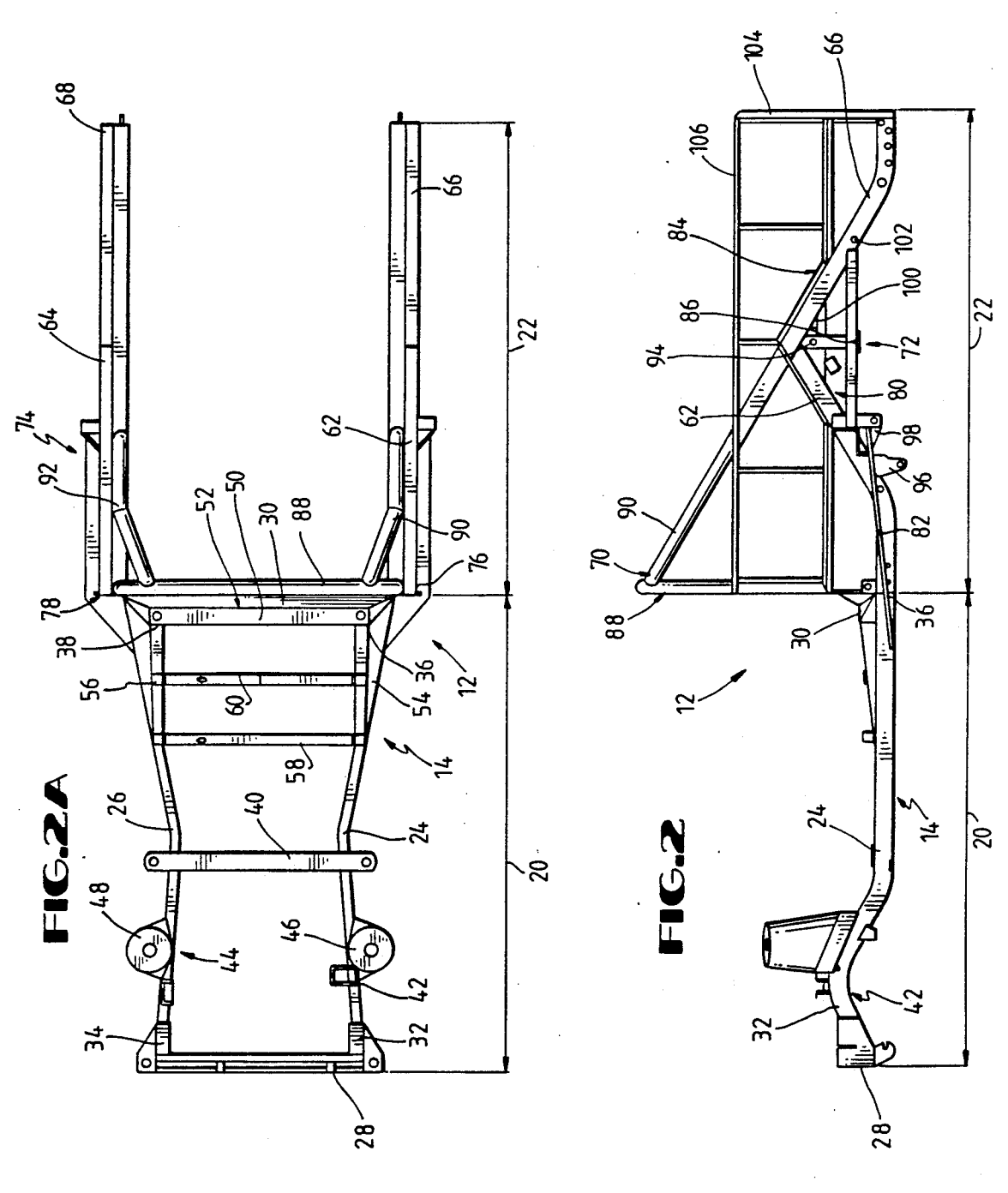

Frame 14 is best shown in FIGS. 2 and 2A. Preferred frame 14 includes an enclosed front section 20 and a U-shaped back section 22. A motor (not shown), transmission (not shown) and cab 23 are all disposed in front section 20. The rear suspension 16 and vertically adjustable bed 18 are disposed in and supported by the U-shaped back section 22.

Front section 20 includes two first side rails 24 and 26, bumper 28 and torque box 30. The first side rails 24 and 26 are disposed substantially parallel to each other. The bumper 28 is disposed across the front ends 32 and 34 of the first side rails 24 and 26. Torque box 30 is disposed across back ends 36 and 38 of first side rails 24 and 26.

Preferably cross member 40 is disposed across the first side rails 24 and 26 between the bumper 28 and torque box 30. Cross member 40 is adapted to receive and assist in supporting the cab 23, motor and transmission.

First rails 24 and 26 include up turned sections 42 and 44 respectively. The up turned sections 42 and 44 are adapted to receive the front suspension (not shown). McPhearson strut housings 46 and 48 are disposed on the up turned sections 42 and 44. The preferred suspension, motor and transmission include a conventional pickup truck front wheel drive system having McPhearson struts.

Torque box 30 includes gusset 50, cross member 52, side plates 54 and 56, and brackets 58 and 60. Torque box 30 provides strength and structural integrity to the entire frame 14, especially to the U-shaped back section 22.

U-shaped back section 22 includes torque box 30, two second side rails 62 and 64, two third side rails 66 and 68, support bar assembly 70, and rear suspension mounting assemblies 72 and 74.

Second side rails 62 and 64 are disposed substantially parallel to each other where front ends 76 and 78 of second side rails 62 and 64 respectively are connected to torque box 30.

The right side of the frame 14, in large part, includes the same structure as the left. Thus, for simplicity and clarity, we will now limit this description to the left side of the frame where the structure is identical.

Preferably the second side rail 62 includes an upturned section 80.

A first brace 82 is disposed across first side rail 24 and second side rail 62. Brace 82 provides lateral support to the left side of frame 14.

Third side rail 66 includes an upturned section 84. Third side rail 66 is connected to the back end of the second side rail 62. A second brace 86 is disposed across second side rail 62 and third side rail 66.

Support bar assembly 70 includes roll bar 88 and support bars 90 and 92. Roll bar 88 is disposed above and across torque box 30. Support bar 90 is disposed between the top left corner of roll bar 88 and the front left end 94 of the third side rail 66. Support bar assembly 70 laterally supports the U-shaped back section 22 without inhibiting the vertical motion of the bed assembly 18.

The left rear suspension mounting assembly 72 is disposed on and between second side rail 62 and third side rail 66. The left assembly 72 include a strut 94, leaf spring mounting plate 96, trailing arm mounting assembly 98, shock mounting plate 100 and shackle mount 102. First brace 82 and second brace 84 are connected to the trailing arm mounting assembly 98 to provide support to the rear suspension. The right rear suspension mounting assembly is disposed in an identical fashion on the right side of the frame 14.

A tail gate guide member 104 is connected to the end of third side rail 66. A side panel frame 106 is disposed between support bar 90 and the tail gate support and guide 104. Again, identical structure is disclosed on the right side of the frame.

Rear Suspension

Rear suspension 16 includes identical left 108 and right 110 assemblies disposed in opposite sides of the U-shaped back section 22. For simplicity, we will again limit our description to the left side.

Left assembly 106 is shown in FIG. 4. Left assembly 106 is substantially disposed between second side rail 62 and third side rail 66 and includes suspension mounting assembly 74, trailing arm assembly 110, leaf spring 112, shock 114 and second stage spring 116.

Trailing arm assembly 110 is shown in FIG. 4 and 4A. Trailing arm assembly 110 includes a bearing housing 118, arm 120, link bearing 122, axle mount flange 124, cup 126 and clevis eye 128. Bearing housing 118 is pivotally disposed in trailing arm mounting assembly 98.

Arm 120 is connected to bearing housing 118 at one end and to axle mount flange 124 at the other end where bearing housing 118 and axle mount flange 124 are disposed substantially parallel to each other. Link bearing 122 is disposed in arm 120. Cup 126 is disposed on the axle mount side of arm 118 and adapted to receive second stage spring. Axle mount flange 124 is adapted to receive a wheel and brake assembly not shown.

Leaf spring 112 includes a centrally disposed shackle mount 130. Leaf spring 112 is connected at one end to the leaf spring mounting plate 96 and at the other to a shackle 132 connected to the shackle mount 102. Leaf spring 112 is pivotally connected to arm 120 through shackle 134.

Shock 110 is disposed between shock mounting plate 100 and the clevis eye 128. Second stage spring 116 is connected to the bottom of strut 94 and adapted to receive cup 126. Rear suspension 16 is interconnected through the arm 120. This feature increases the strength, lateral stability and alignment of the suspension. Identical structure is disposed on the right side of the U-shaped back section 22.

Vertical Bed Assembly

The left side of vertical bed assembly 16 is shown entirely in FIG. 3 and partially in FIGS. 4, 5, 6, 7A and 7B. Bed assembly 16 is rotatably disposed in the U-shaped back section 22. Bed assembly 16 includes floor 135, tailgate assembly 136, lifting assembly 140 and positioning and locking assembly 142.

Floor 134 is best shown in FIGS. 7A and 7B. Floor 135 includes frame 144, bobbins 146-152, and tailgate sleeves 154-160. Bobbins 148 and 150 may include guide rod 155 shown in FIG. 6. Preferably floor 135 is made of a lightweight material such as aluminum and a high strength structure.

The left side of tailgate assembly 136 is best shown in FIG. 6 where tailgate assembly 136 includes tailgate 162 and closure plates 164 having roller 166. The right side includes a similar closure plate. Tailgate assembly 136 is pivotally connected to floor 135 through sleeves 154-160.

The left side of lifting assembly 140 is shown in its entirety in FIG. 3 and partially in FIGS. 4, 5 and 6. The structure of the lifting assembly 140 is essentially identical on both sides of the frame 14. Thus we will describe the left side with the understanding the right side includes an identical structure. The left side of lifting assembly 140 includes two three point linkages ("boomerangs") 172 and 174, a linear articulating means 176 and connecting rod 178.

Boomerang 172 is pivotally disposed on the inside of second side rail 62. Boomerang 174 is pivotally disposed on the inside of third side rail 66. The lower ends 180 and 182 of boomerangs 172 and 174 are pivotally connected to floor 135. The top ends 184 and 186 of boomerangs 172 and 174 are pivotally connected to each other by connecting rod 178.

Linear articulating means 176 is disposed at one end to the torque box 30 and at the other end to boomerang 172. Articulating means 176 may include hydraulic, pneumatic, or screw actuation. The preferred linear articulation means 176 includes the hydraulic cylinder assembly shown.

The left side of the locking and positioning assembly 142 is shown in FIG. 6 and is identical to the right side (not shown). For simplicity we will describe the left side with the understanding that the right side includes identical structure. Locking and positioning assembly 142 includes bobbins 146 and 148, closure plate 164, latch plates 190 and 192, cam plate 194, boomerang locking assembly 196 and tailgate lock 198.

Latch plate 190 is connected to the inside of second siderail 62 and latch plate 192 is connected to the inside of third side rail 66. Latch plates 190 and 192 include slots 200 and 202 which are adapted to receive bobbins 146 and 148 respectively. Latch plate 192 includes a pivotal rod support adapted to slidably receive guide rod 155.

Cam plate 194 is connected to the end of the third siderail 66. Cam plate 194 is adapted to receive roller 166 of closure plate 164.

Boomerang locking assembly 196 includes a cam actuated latch 204 pivotally mounted to the side of the side panel frame 106. Latch 204 is adapted to receive and lock the top end of boomerang 174 when the bed assembly 18 is in the raised transporting position.

Tailgate lock 198 is a mechanically actuated lock that includes a lock plate 206 pivotally connected on the tailgate guide member 104. A slot 208 is disposed in the tailgate and adapted to receive the lock plate 206.

The description of the preferred embodiment is meant to be a clear indication of the inventive structure. However, reasonable modifications and variations are possible without departing from the spirit or scope of the invention.

What is claimed is:

1. A vehicle chassis comprising:
   (a) two side rail assemblies disposed substantially parallel to each other, each side rail assembly includes:
      i. A first side rail having an upturned section near the front;
      ii. a second side rail having an upturned back end that is connected by its front end to the back end of the first rail;
      iii. a first brace disposed between the first and second side rails;
      iv. a third side rail having an upturned front end that is connected to the upturned back end of the second side rail; and
      v. a second brace disposed between the turned up portions of the second and third side rails;
   (b) a bumper disposed across the front ends of the first rails;
   (c) a torque box disposed across the back ends of the first rails;
   (d) at least one cross member disposed across the first rails between the bumper and the torque box;
   (e) a roll bar support assembly including:
      i. a roll bar disposed above and across the torque box; and
      ii. two support bars where one support bar is disposed between the roll bar and the front end of the third side rail on each side of the chassis;
   (f) a front frame section defined by the bumper, two first side rails and the torque box that is adapted to receive and support a front suspension, motor, transmission and cab;
   (g) a U-shaped back frame section defined by the torque box, roll bar support assembly, second side rails and third side rails that is adapted to receive an adjustable bed and rear suspension;
   (h) two rear suspension support assemblies disposed on each side of the U-shaped back section between the upturned sections of the second and third side rails where each suspension support assembly includes:
      i. a strut disposed between the second brace and the connection between the second and third side rail;
      ii. a leaf spring mounting plate disposed on the second rail;
      iii. a trailing arm mounting plate disposed on the second rail between the spring mounting plate and the strut;
      iv. a shock mounting plate disposed between the strut and the third side rail; and
      v. a first shackle rotatably connected at one end to the third side rail;
   (i) two leaf springs each having a centrally disposed shackle mount, where one leaf spring is disposed on each side of the chassis between the spring mounting plate and the first shackle;
   (j) two trailing arm assemblies each having an arm and an axle mount flange disposed at one end of the arm where one trailing arm is rotatably disposed on each side of the chassis to the trailing arm mount by the end opposite the axle mount flange;
   (k) two second shackles where one second shackle is disposed on each side of the chassis between the leaf spring shackle mount and the axle mount end of the trailing arm;
   (l) two second stage springs where one spring is disposed on each side of the chassis to the bottom the strut;

(m) two shocks where one shock is disposed on each side of the chassis between the shock mounting plate and axle mount end of the trailing arm;

(n) two first boomerangs where one boomerang is rotatably disposed on each side of the chassis to the inside of the second rail between the front end of the second rail and the spring mount plate;

(o) two second boomerangs where one boomerang is rotatably disposed on each side of the chassis to the inside of the third side rail between the back end of the third side rail and the first shackle mount;

(p) two connecting rods where one connecting rod is disposed on each side of the chassis between the top end of the first and second boomerangs;

(q) two hydraulic cylinders where one cylinder is disposed on each side of the chassis and pivotally connected at one end to the frame and at the other end to the top portion of the first boomerang;

(r) a means for actuating the hydraulic cylinders;

(s) a bed assembly rotatably connected to the bottom end of each boomerang;

(t) a tail gate assembly rotatably connected to the back end of the adjustable bed;

(u) a bed locking assembly including:
  i. a plurality of latch plates where latch plates are disposed on each side of the chassis to the third side rail;
  ii. a plurality of bobbins adapted to engage each latch plate;
  iii. two guide rods rotatably connected at one end to the bobbin and rotatably connected at the other end to the latch plate in sliding relation; and
  iv. a means for locking the tail gate to the frame.

* * * * *

UNITED STATES PATENT AND TRADEMARK OFFICE
CERTIFICATE OF CORRECTION

PATENT NO. : 5,035,462

DATED : July 30, 1991

INVENTOR(S) : Robert L.G. Page and William J. Honan

It is certified that error appears in the above-identified patent and that said Letters Patent is hereby corrected as shown below:

```
Column 2, line 60, change "top" to --side--.
Column 4, line 9,  change "include" to "includes".
Column 4, line 25, delete "110".
Column 4, line 28, change "106" to --108--.
Column 4, line 29, change "106" to --108--.
Column 4, line 53, change "110" to --114--.
Column 5, line 1,  change "134" to --135--.
```

Signed and Sealed this

Fifth Day of January, 1993

Attest:

DOUGLAS B. COMER

*Attesting Officer*    Acting Commissioner of Patents and Trademarks